(12) United States Patent
Schmidt

(10) Patent No.: US 6,169,849 B1
(45) Date of Patent: Jan. 2, 2001

(54) VENTILATION—HEATING APPARATUS

(75) Inventor: Reinhard Schmidt, Olsberg (DE)

(73) Assignee: Olsberg Hermann Everken GmbH, Olsberg (DE)

(\*) Notice: Under 35 U.S.C. 154(b), the term of this patent shall be extended for 0 days.

(21) Appl. No.: 09/309,608

(22) Filed: May 11, 1999

(30) Foreign Application Priority Data

Jun. 17, 1998 (DE) .............................................. 198 27 031

(51) Int. Cl.⁷ ...................................................... F24H 3/00
(52) U.S. Cl. ............................ 392/344; 392/354; 165/54; 454/239
(58) Field of Search ..................................... 392/344, 354, 392/357, 358; 165/121–122, 104.15, 54; 237/46–49; 454/239; 236/49.3

(56) References Cited

U.S. PATENT DOCUMENTS

| | | | | |
|---|---|---|---|---|
| 4,352,349 | * | 10/1982 | Yoho | .................... 236/49.3 |
| 5,855,320 | * | 1/1999 | Grinbergs | ............................... 237/46 |

FOREIGN PATENT DOCUMENTS

| | | | |
|---|---|---|---|
| 7716584 | | 11/1977 | (DE) . |
| 2731487 | | 1/1979 | (DE) . |
| 9217836 | | 4/1993 | (DE) . |
| 4002560 | | 7/1995 | (DE) . |
| 295 08 171 U | | 10/1995 | (DE) . |
| 195 00 527 | | 7/1996 | (DE) . |
| 195 08 252 | | 9/1996 | (DE) . |
| 195 34 842 | | 4/1998 | (DE) . |
| 97216 | * | 1/1984 | (EP) ........................ 165/54 |
| 942065 | * | 1/1949 | (FR) ........................ 165/54 |
| 2288948 | * | 5/1976 | (FR) ...................... 392/344 |
| 2529308 | * | 12/1983 | (FR) ........................ 165/54 |
| 981713 | * | 1/1965 | (GB) ...................... 392/344 |
| 60-17650 | * | 1/1985 | (JP) ........................ 165/54 |
| 63-150548 | * | 6/1988 | (JP) ........................ 165/54 |
| 2-64331 | * | 3/1990 | (JP) ........................ 165/54 |
| 3-134418 | * | 6/1991 | (JP) ........................ 165/54 |
| 3-158641 | * | 7/1991 | (JP) ........................ 165/54 |

OTHER PUBLICATIONS

Eickenhorst, Heinz: Wohnungslüftung mit Wärmerückgewinnung. In: *IKZ– Haustechnik, brochure 14, 1995*, pp. 112–118.

Urbanek, Axel: Wärmerückegewinnung und Warmluft–Heizung. In: *Sonnenenergie & Wärmepumpe*, year of publ. 7, broch. 5–6, Sep./Dec. 1982, pp. 46–48.

\* cited by examiner

*Primary Examiner*—John A. Jeffery
(74) *Attorney, Agent, or Firm*—Townsend and Townsend and Crew LLP

(57) ABSTRACT

A ventilation-heating apparatus comprises a fresh air passage with which a fresh air ventilation mechanism is associated and which opens into a room-side inflow air supply opening. The ventilation-heating apparatus further comprises a room air passage with which a room air ventilation mechanism is associated and which opens into a room-side air removal outlet opening. Fresh air and room air passages are passed through a heat exchanger which is suitable for the transfer of heat from the room air passage to the fresh air passage. An electrically heatable metallic heating element is provided in the region of the fresh air passage. A suitable heat storage element is associated with the heating element for the storage of the heat produced. An electrically heatable metallic additional heating element which can be selectively switched on is provided in the region of the fresh air passage.

18 Claims, 2 Drawing Sheets

VENTILATION—HEATING APPARATUS

BACKGROUND OF THE INVENTION

The present invention relates to a ventilation-heating apparatus comprising a fresh air passage with which a fresh air ventilation means is associated and which opens into a room-side inflow air supply opening, and comprising a room air passage with which a room air ventilation means is associated and which opens into a room-side air removal outlet opening, with the fresh air and room air passages being passed through a heat exchanger which is suitable for the transfer of heat from the room air passage to the fresh air passage, and with an electrically heatable metallic heating element being provided in the region of the fresh air passage.

Ventilation-heating apparatuses of this kind are used for the inward and outward ventilation and for the heating of closed rooms, with it being possible to achieve a favorable energy balance through the heat exchanger provided.

Disadvantageous in known ventilation-heating apparatuses is the fact that the relevant room cannot always be heated to the desired extent. A brief strong rapid heating is often not possible, whereas on the other hand when a slow variation of the room temperature is desired the heated inlet air which is supplied changes its temperature in an undesirably abrupt manner when the electrically heatable element is switched on, in particular since in this case the heating element is always switched on as a rule only briefly.

SUMMARY OF THE INVENTION

An object of the invention consists in designing a ventilation-heating apparatus of the initially named kind in such a manner that a brief rapid heating is possible and that abrupt temperature changes in the heated inlet air flow which is supplied are avoided in the normal heating operation.

This object is satisfied in accordance with the invention in that a heat storage element which is suitable for the storage of the heat produced is associated with the heating element; and in that in addition an electrically heatable metallic additional heating element which can be selectively switched on is provided in the region of the fresh air passage.

The heat storage element causes a heating function to still be provided even after the switching off of the heating element since the heat storage element does not cool down immediately, but only slowly, in dependence on its mass and on its thermal inertia. It is thus possible to hold the unit consisting of the heating element and the heat storage element at a largely constant temperature even in the event of the alternating switching on and off of the heating element or to vary this temperature intentionally slowly so that no abrupt temperature fluctuations arise in the heated inlet air flow which is supplied.

Through the additional heating element the heating power can—when required—be considerably increased in order for example to realize a rapid heating function.

The apparatus in accordance with the invention thus enables a particularly flexible heating function with respect to the heating power which is at the same time found to be very agreeable as a result of the avoidance of abrupt temperature variations.

It is preferred when the heating element—in a manner similar to an immersion heater—is designed as a heating wire and the heat storage element as a jacket tube which surrounds the heating wire and which in particular consists of steel, preferably of chromium-nickel steel. Between the jacket tube and the heating wire an insulation is preferably provided in this case, which can for example consist of a magnesium oxide layer.

The jacket tube can for example have a length between 100 and 150 cm, in particular of approximately 130 cm, and an inner or outer diameter between 3 and 5 cm, in particular of approximately 4 cm. The storage mass of the heat storage element can have a volume between 1.0 and 3.0 $dm^3$, in particular between 1.0 and 2.5 $dm^3$, preferably of approximately 1.8 $dm^3$.

The additional heating element is preferably designed as a pure heating coil, the heating power of which, for example, lies between 500 and 2000 W, in particular at approximately 1800 W. The heating power of the heating element can, for example, amount to between 100 and 300 W and preferably amounts to approximately 200 W. The heating power of the additional heating element is preferably greater than the heating power of the heating element by a factor between 3 and 15, in particular by a factor of approximately 9.

As far as reference is made in connection with the invention to the heating power of the heating element it can be a matter here either of a momentary value which is continuously provided during the switching on period of the heating element or of an average value which results from an intermittent heating operation which is provided during the switching on period.

The fresh air ventilation means can be placed after the heat exchanger in the flow direction of the fresh air passage. In this it is advantageous when the heating element is arranged between the heat exchanger and the fresh air ventilation means.

Between the heating element and the fresh air ventilation means a temperature sensor can be provided in the region of the fresh air passage which measures the temperature of the fresh air which is heated by the heating element for the purpose of a control or regulation function. This or a further sensor can also be arranged in such a manner that it ultimately determines the temperature of the heat storage element in accordance with the invention for control or regulation purposes.

It is advantageous when a temperature sensor is provided between the room-side air removal outlet opening and the heat exchanger in the region of the room air passage by means of which the temperature of the sucked in outlet air can be determined for control or regulation purposes.

It is preferred when a heat storage element which is suitable for storing the heat produced is associated exclusively with the heating element, but not with the additional heating element however.

The additional heating element can be placed after the fresh air ventilation means in the flow direction of the fresh air passage, through which it is achieved in an advantageous manner that the sensor, which is placed ahead of the fresh air ventilation means, is not negatively influenced or damaged by the additional heating element, which as a rule has a very high heating power.

Furthermore, it is preferred when the ventilation means which is associated with the fresh air passage runs at a speed of rotation during the operation of the additional heating element which is substantially greater than the speed of rotation when the additional heating element is switched off or, respectively, when the heating element is operated only with the heat storage element. Through this the large additional heating power is rapidly available in the relevant room, as is desired by the user, and an overheating of the apparatus is avoided. For example a control and regulation unit can be provided which controls, among other things, the speed of rotation of the fresh air ventilation means and automatically causes the increase of the speed of rotation when the additional heating element is switched on.

Further preferred embodiments of the invention are set forth in the subordinate claims.

DESCRIPTION OF THE SPECIFIC EMBODIMENTS

Figure 1:
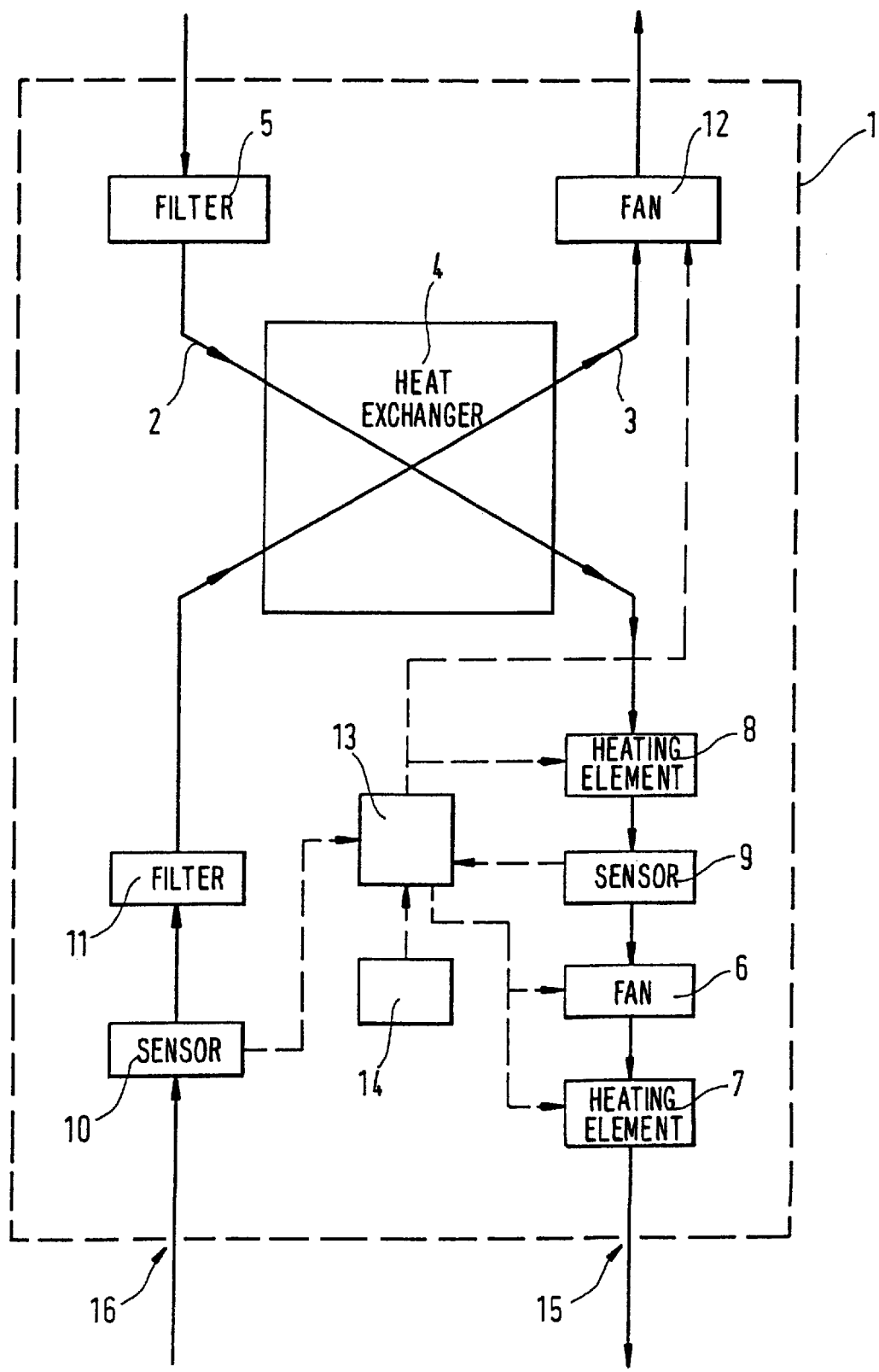
FIG. 1 shows a schematic block diagram of a ventilation-heating apparatus in accordance with the invention in one possible preferred embodiment.

The ventilation-heating apparatus 1 has a fresh air passage 2 as well as a room air passage 3 which are both passed through a plate—heat exchanger 4 in which heat can be transferred from the room air passage 3 to the fresh air passage 2.

The two passages 2, 3 extend separately from one another so that no mixing of the two air flows can arise in the entire ventilation-heating apparatus 1.

The outside air which enters from the atmosphere into the ventilation-heating apparatus 1 enters the heat exchanger 4 through a fine dust filter 5. A fan 6 which is placed after the heat exchanger 4 in the flow direction provides for the production of the fresh air flow in the fresh air passage 2. Placed ahead of the fan 6 in the flow direction are a heating element 8 which is designed as a tubular heating body and a temperature sensor 9, with the temperature sensor 9 being located between the tubular heating body 8 and the fan 6. Placed after the fan 6 in the flow direction is an additional heating element 7 which is designed as a heating coil.

Both heating elements 7, 8 can be heated up electrically.

Figure 2:
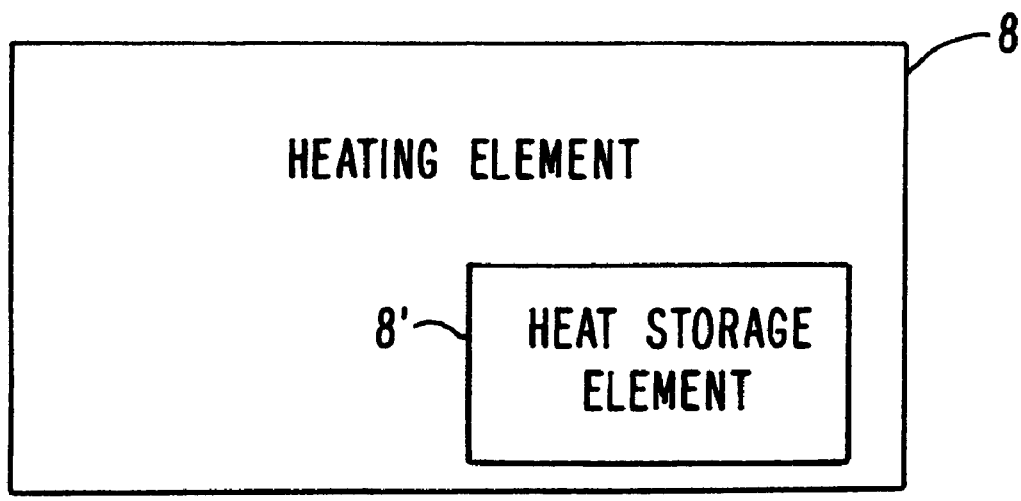
FIG. 2 shows a schematic view of one possible preferred embodiment of a first heating element in the apparatus of FIG. 1.

Only the heating element 8, however, has as a result of its mass a thermally inert heat storage element 8' (FIG. 2), which can be heated up by the heating element 8 and which is suitable for storing the heat which is yielded by the heating element 8. The additional heating element 7 has no heat storage element.

The temperature sensor 9 is suitable for determining the temperature of that fresh air which leaves the tubular heating body 8 in the direction of a room-side inflow air supply opening 15.

Alternatively, it is also possible to design the sensor 9 in such a manner that it measures the temperature of the heat storage element of the tubular heating body 8 in order thereby to be able for example to regulate the temperature of the heat storage element to a largely constant temperature.

A room temperature sensor 10 is arranged in the room air passage 3 between a room-side air removal outlet opening 16 and the heat exchanger 4. Between this temperature sensor 10 and the heat exchanger 4 is located a dust filter 11 which ensures that no dust from the room air enters into the heat exchanger 4.

The room air passage 3 is provided with a fan 12 which is placed after the heat exchanger 4 in the flow direction and which forwards room air from the room-side air removal outlet opening 16 into the atmosphere.

Finally, a control and regulation unit 13 which is equipped with the sensors 9, 10 and with an operating unit 14 is provided in the illustrated ventilation-heating apparatus 1. In this the control and regulation unit 13 influences the operating state of the fans 6, 12 and of the heating elements 7, 8. In this the speeds of rotation of the fans 6, 12 and the heating power of the heating elements 7, 8 are in particular controlled or regulated respectively.

Various operating modes of the illustrated ventilation-heating apparatus are possible, some of which will be described in the following in a merely exemplary manner:

a) Only fan 6 is operated, whereas the fan 12 is switched off. In this case the heat exchanger 4 has no function; outer air is merely forwarded from the atmosphere via the inflow air supply opening into a room interior. In this a heating function can be selectively realized through the operation of the heating elements 7 and/or 8.

b) Both fans 6, 12 are operated, but neither of the two heating elements 7, 8. In this case a heating of the outer air which is supplied from the atmosphere takes place exclusively in the heat exchanger 4, which is particularly energy saving. This operation mode is always possible when either the outer air which is sucked in from the atmosphere is warm enough or the desired heating power is sufficiently low.

c) Both fans 6, 12 and the heating element 8 and thereby automatically the heat storage element which is associated with it are operated. In this case an additional heating of the outer air which is supplied from the atmosphere takes place through the heating element 8, with it being possible for the regulation of the switching on and off of the heating element 8 to take place in such an automatic manner that the heat storage element of the heating element 8 always remains at a largely constant temperature.

d) Both fans 6, 12 and the additional heating element 7 are operated. This is advisable when a brief rapid heating of a room interior is to be achieved. In this it is advantageous when the fan 6 runs at as high a speed of rotation as possible.

e) The strongest and most rapid heating up of a room interior takes place when the two fans 6, 12 and both heating elements 7, 8 are operated.

The above listing is merely exemplary; a large number of other operating states are realizable. In particular all heating functions can be achieved when only the fan 6—without the fan 12—is operated. In these cases merely an outward ventilation of the room interior is dispensed with; an inward ventilation with heated fresh air is however achieved.

What is claimed is:

1. A ventilation-heating apparatus comprising:
   a fresh air passage which opens into a room-side inflow air supply opening;
   a room air passage which opens into a room-side air removal outlet opening,
   a heat exchanger through which the fresh air and room air passages pass through to transfer heat from the room air passage to the fresh air passage;
   a first heating element provided in the fresh air passage;
   a second heating element provided in the fresh air passage, the second heating element being operable to selectively switch on or off;
   a fresh air ventilation means disposed in the fresh air passage downstream of the heat exchanger in a flow direction of the fresh air passage;
   a room air ventilation means disposed in the room air passage; and
   a control and regulation unit operatively coupled with the first and second heating elements and with the fresh air and room air ventilation means, wherein when the second heating element is switched on, the fresh air ventilation means is automatically controlled by the control and regulation unit to operate at a higher speed of rotation than a speed when the second heating element is switched off.

2. The ventilation-heating apparatus of claim 1 wherein the second heating element has a heating power which is greater than a heating power of the first heating element by a factor of between 3 and 15.

3. The ventilation-heating apparatus of claim 2 wherein the heating power of the second heating element is greater than the heating power of the first heating element by a factor of 9.

4. The ventilation-heating apparatus of claim 2 wherein the second heating element has a heating power of between 500 and 2000 W, and the first heating element has a heating power of between 100 and 300 W.

5. The ventilation-heating apparatus of claim 4 wherein the second heating element has a heating power of 1800 W, and the first heating element has a heating power of 200 W.

6. The ventilation-heating apparatus of claim 1 wherein the first heating element includes a heat storage element associated therewith for storage of heat produced thereby.

7. The ventilation-heating apparatus of claim 6 wherein the heat storage element is associated exclusively with the first heating element and not with the second heating element.

8. The ventilation-heating apparatus of claim 6 wherein the heat storage element includes a storage mass having a volume of between 1 and 2.5 $dm^3$.

9. The ventilation-heating apparatus of claim 8 wherein the storage mass of the heat storage element has a volume of 1.8 $dm^3$.

10. The ventilation-heating apparatus of claim 1 wherein the fresh air ventilation means is disposed downstream of the heat exchanger.

11. The ventilation-heating apparatus of claim 1 wherein the first heating element is disposed between the heat exchanger and the fresh air ventilation means.

12. The ventilation-heating apparatus of claim 1 further comprising a temperature sensor disposed in the fresh air passage between the first heating element and the fresh air ventilation means.

13. The ventilation-heating apparatus of claim 1 further comprising a temperature sensor disposed in the room air passage between the heat exchanger and the room-side air removal outlet.

14. The ventilation-heating apparatus of claim 1 wherein the second heating element is disposed downstream of the fresh air ventilation means.

15. The ventilation-heating apparatus of claim 1 wherein the control and regulation unit is operatively coupled with a room air temperature sensor disposed in the room air passage and a fresh air temperature sensor disposed in the fresh air passage.

16. The ventilation-heating apparatus of claim 1 wherein the control and regulation unit is operatively coupled with an operating unit.

17. The ventilation-heating apparatus of claim 1 wherein the first heating element is an electrically heatable metallic heating element.

18. The ventilation-heating apparatus of claim 1 wherein the second heating element is an electrically heatable metallic heating element.

* * * * *